(12) United States Patent
Harris et al.

(10) Patent No.: US 7,073,998 B2
(45) Date of Patent: Jul. 11, 2006

(54) MECHANICAL LOCK-UP FOR PIVOTING TABLE

(75) Inventors: Luke J. Harris, Leola, PA (US); Anthony F. Diederich, Jr., Terre Hill, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/920,013

(22) Filed: Aug. 17, 2004

(65) Prior Publication Data

US 2006/0045658 A1  Mar. 2, 2006

(51) Int. Cl.
*A01D 90/08* (2006.01)
*B65H 15/00* (2006.01)

(52) U.S. Cl. ............... 414/111; 414/467; 414/789.3

(58) Field of Classification Search ............ 414/789.3, 414/503, 900, 111, 24.5, 24.6, 25, 400, 493, 414/523, 552, 789.7, 469, 679; 298/38; 248/222.52, 248/299.1; 16/312, 315, 319, 325; 403/92–93
See application file for complete search history.

(56) References Cited

U.S. PATENT DOCUMENTS

| | | | |
|---|---|---|---|
| 2,848,127 A | 8/1958 | Grey | 214/510 |
| 3,084,815 A * | 4/1963 | Johnson | 414/557 |
| 3,934,734 A | 1/1976 | Grey et al. | 214/6 B |
| 4,078,523 A * | 3/1978 | Etzler | 119/58 |
| 4,119,218 A * | 10/1978 | Guenon et al. | 414/789.3 |
| 4,150,756 A | 4/1979 | Butler | 414/40 |
| 4,261,677 A | 4/1981 | Hirahara et al. | 414/39 |
| 4,516,389 A * | 5/1985 | Core | 56/341 |
| 4,534,691 A * | 8/1985 | Miguel | 414/789.2 |
| 4,710,086 A * | 12/1987 | Naaktgeboren et al. | 414/789.7 |
| 5,758,481 A * | 6/1998 | Fry | 56/474 |
| 2004/0139717 A1* | 7/2004 | Underhill | 56/314 |

* cited by examiner

Primary Examiner—Eileen D. Lillis
Assistant Examiner—Gregory Adams
(74) Attorney, Agent, or Firm—Stephen A. Bucchianeri; John William Stader; Michael G. Harms

(57) ABSTRACT

A manually operated mechanism for locking the first table of a bale wagon in the raised position. The mechanism uses gravity to both engage and disengage the lock to permit an operator to safely service the components of the wagon below the first table.

8 Claims, 6 Drawing Sheets

MECHANICAL LOCK-UP FOR PIVOTING TABLE

BACKGROUND OF THE INVENTION

The present invention relates generally to agricultural bale wagons for retrieving bales from a field, and more particularly to a mechanical locking mechanism for holding the first table in a raised position.

The general operation of a bale wagon is clearly described in U.S. Pat. No. 2,848,127. Specifically, the bale wagon to which the instant invention applies functions to automatically pick up and stack bales, such as hay bales, from the positions in which they are dropped by hay cutting and baling machines which precede the bale wagon in the field.

Bale wagons operate by moving along a line of bales lying in a field, and aligning the chute-like mechanism on the front of the machine, the bale loader, with each bale. A vertical chain conveyor with protruding cleats lifts the bale upwardly and a deflector then tips the bale sideways, onto the receiving bed of the wagon, called the first table, at a point which is essentially the foremost portion of one of the side edges of the wagon.

At this point, a cross-conveyor moves the bale across the width of the wagon, forming a one-bale wide row on the first table at the leading edge of the wagon. The first table then tips rearwardly, depositing the row of bales on the front edge of the second table. This process is repeated until the second table is filled with its full compliment of bales. This table is then tipped rearwardly placing the bales onto a larger bed, called the third table, where tiers accumulate. When a predetermined number of tiers have been accumulated on the third table, this bed, in turn, is tipped rearwardly to deposit a multilayered stack of bales. Typical bale wagons are also capable of automatically unloading an entire stack, for some bale wagons as many as 160 bales.

FIGS. 3 and 4 provide detailed views of the locking mechanism for the first table 20 as it would appear on the left side of the bale wagon. While the left side is the most convenient for the operator, and the most logical location, it could be located on either side. Left side pivot arm 50 (right side pivot arm 30 not shown) is pivotably affixed to support member 12 by a pivot pin (not shown) on transverse axis 52. Another pivot pin 53 (FIG. 3) on transverse axis 54 pivotally supports a stop tab assembly comprised of stop tab hub 56 with a stop tab 58 affixed thereto, as by welding. Stop tab hub 56 is free to rotate about the pivot pin on axis 54, and bushings and/or bearings provide ease of rotation. Also pivotally supported on the pivot pin 53 on the transverse axis 54 is a handle assembly comprised of a handle hub 60, handle 62 and tang 64. Handle 62 and tang 64 are affixed to handle hub 60, as by welding. Tang 64 is of such length and location as to extend into the rotational path of stop tab 58.

It would be a distinct advantage to provide means for conveniently and safely locking and unlocking the first table in the raised position.

SUMMARY OF THE INVENTION

Accordingly, it is an important object of the present invention is to provide a manually operated mechanism for locking and unlocking the first table in the raised position.

Another object of the present invention is to provide a mechanical mechanism for selectively locking the first table of a bale wagon in the raised position.

It is another object of the instant invention to provide a mechanism for permitting an operator to safely service the operating components of the first table of a bale wagon.

It is a further object of the instant invention to provide a safety mechanism that allows no movement of the first table until the operator has safely returned to the cab and depresses the first table up switch.

It is a still further object of the instant invention to provide a first table lock that contains no springs, and uses gravity for both engagement and disengagement.

It is an even still further object of the instant invention to provide a mechanism for locking the first table of a bale wagon in the raised position that uses low profile components that do not collect chaff and other debris.

It is another object of this invention to provide a safety mechanism for the first table of a bale wagon that is durable in construction, inexpensive of manufacture, carefree of maintenance, facile in assemblage, and simple, versatile and effective in use.

These and other objects are attained by providing a manually operated mechanism for locking the first table of a bale wagon in the raised position. The mechanism uses gravity to both engage and disengage the lock to permit an operator to safely service the components of the wagon below the first table.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
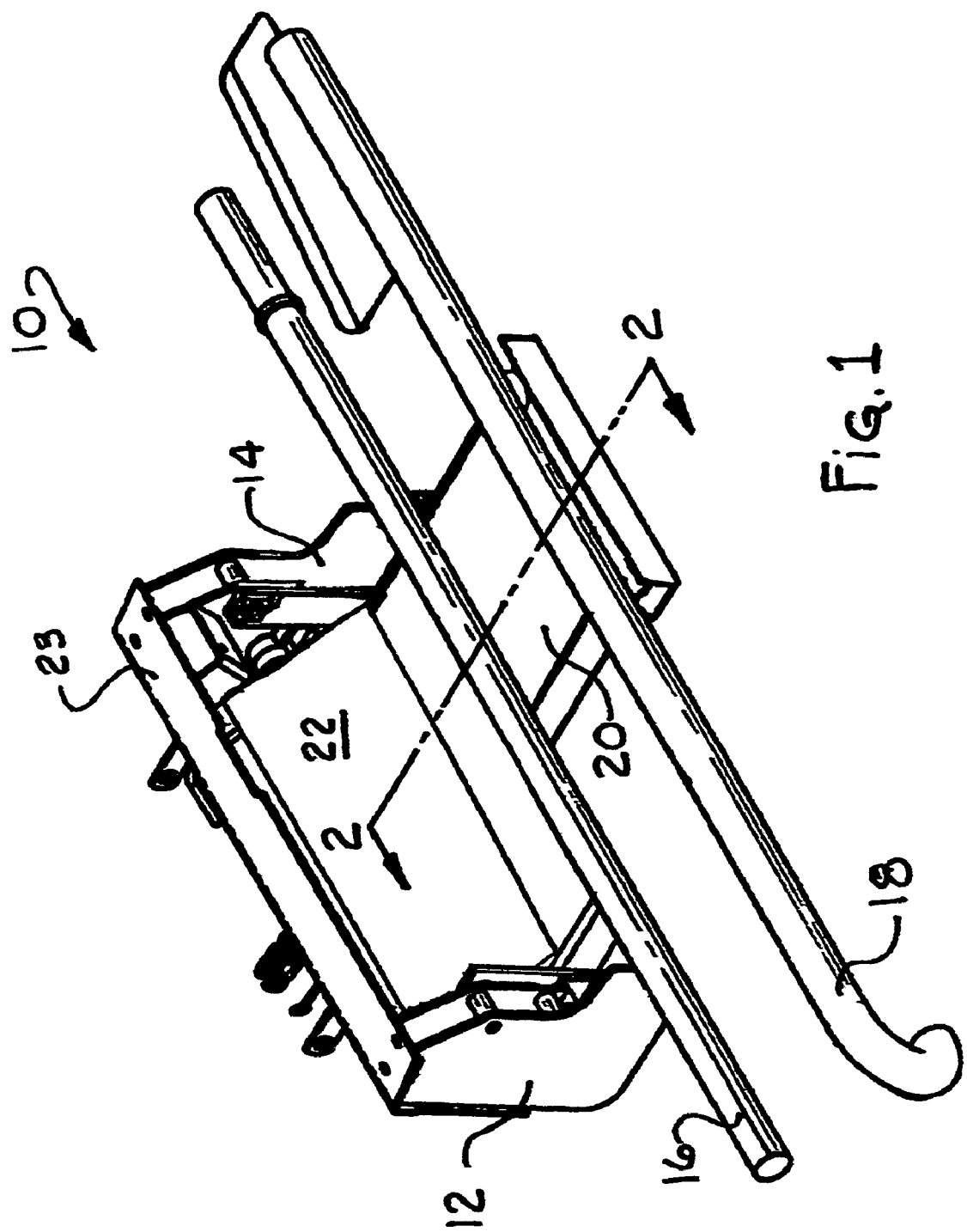
FIG. 1 is a partial right front perspective view of a first table of a bale wagon suitable for use of the present invention.

The general operation, and the concept of a first table, is fully disclosed and discussed in the BACKGROUND OF THE INVENTION, and since the locking mechanism to be described relates to the first table, this disclosure will begin with reference to the first table partially shown in FIG. 1. First table 10 is partially comprised of a pair of spaced-apart supports 12, 14 rigidly affixed to and supported by the main frame (not shown) of the bale wagon. The bale-supporting portion of the first table is relatively simple, comprised generally of two transverse pipe-like rails 16, 18 generally held together by a longitudinal relatively flat framing structure 20 to which rails 16, 18 are attached. Structure 20 merges rearwardly into an inclined structure 22. The framing structure 20 and inclined structure 22 are relatively rigid and sturdy in construction so as to maintain its integrity throughout a long life of rugged use. A top cap member 23 interconnects the two supports 12, 14, providing significant structural integrity. Surface 22 is inclined and continuous primarily to deflect straw, chaff and debris and direct it toward the ground and support and guide bales from the first table to the second table as the first table pivots, as discussed below.

Figure 2:
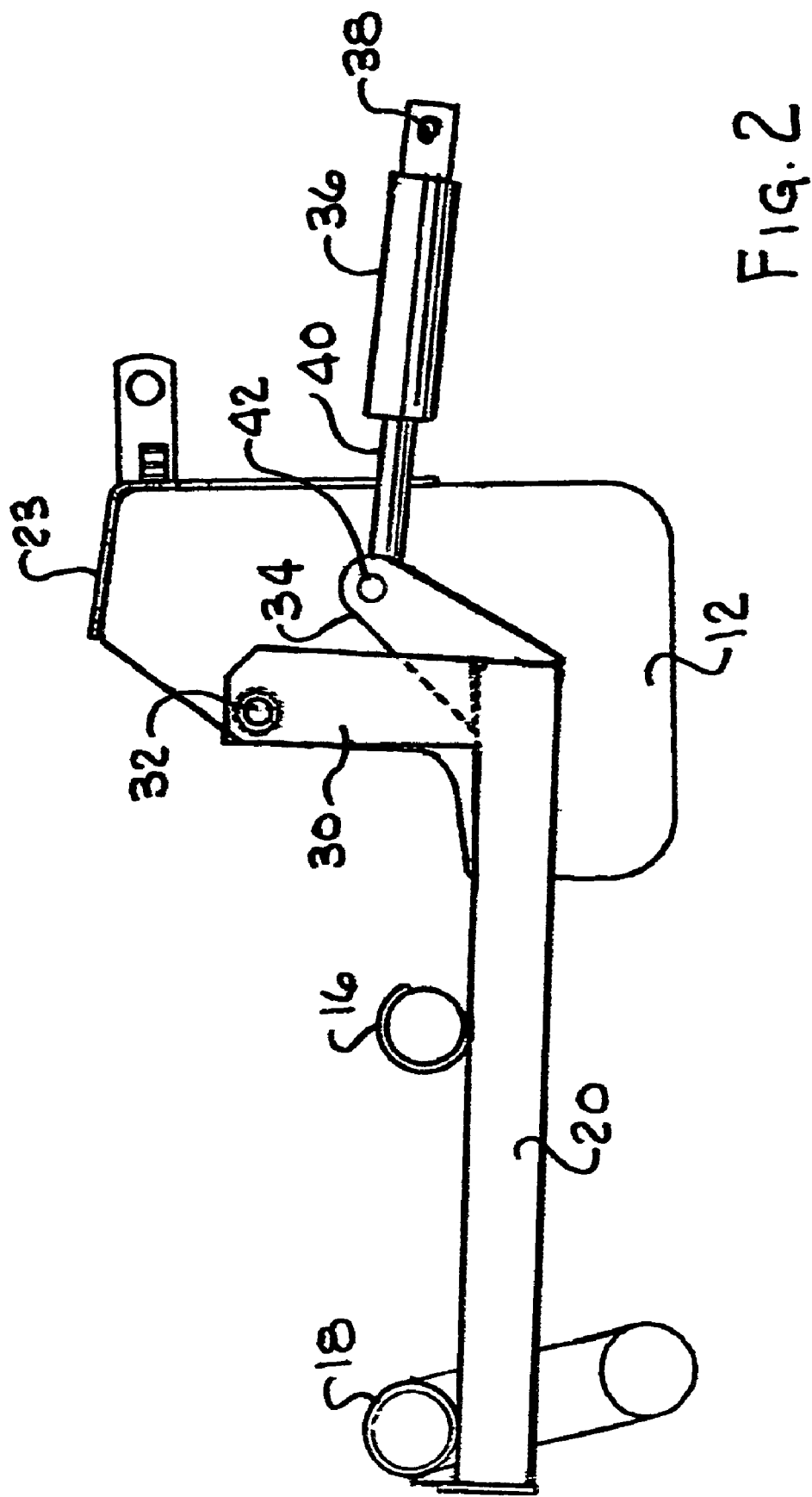
FIG. 2 is a partial cross section of the table of FIG. 1, taken along lines 2—2.

Referring now to FIG. 2, primary structural components of the pivoting mechanism of the first table are shown to comprise a generally vertical pivot arm 30 affixed to structure 20 and generally perpendicular thereto. Pivot arm 30 is pivotably affixed to support 12 via bolt or pin 32. To make the pivoting motion easier and more stable, bushings and spacers may be used. The first table employs two axially aligned pivot pins, spaced, in the preferred embodiment, on either side of structure 20. A single lever arm 34 is located generally centrally of the table and affixed to structure 20. A single-acting hydraulic cylinder 36 is pivotably affixed at end 38 to a structural portion of the bale wagon frame (not shown) and cylinder ram 40 is pivotably affixed to lever arm 34. Thus, when ram 40 of hydraulic cylinder 36 is extended, table 10 pivots upwardly about pin 32. The attachment point 42 of ram 40 to lever arm 34 must be below pivot pin 32 in order for the table to pivot as required.

The first table of a typical bale wagon is quite heavy and usually powered by a single-acting hydraulic cylinder, thus relying on the weight of the table to return to its resting horizontal position. Additionally, the operation of a bale wagon generates a significant volume of chaff and other debris that accumulate in the area of the first stable. Since it is necessary to perform daily servicing under the first table, and since neither the hydraulic nor electrical circuits provide a means to hold the table in the vertical or up position without the operator holding down the momentary first table up switch (the release of which will cause the table to fall), it is inconvenient for a single person to perform full maintenance in this area of the bale wagon.

A cam 70, with outer cam surface 72 is affixed to pivot arm 50 and located such that the outer end of stop tab 58 will, under conditions to be explained below, follow cam surface 72 as the first table is pivoted to the up position. Cam surface 72 includes a somewhat step-shaped notch 74 in the upper end thereof that will lock onto stop tab 58 under conditions to be described below in regard to the operation of the locking mechanism. Handle 62 is held in the unlock position by a spring clip or clasp 76 that is affixed to cap member 23.

Figure 3:
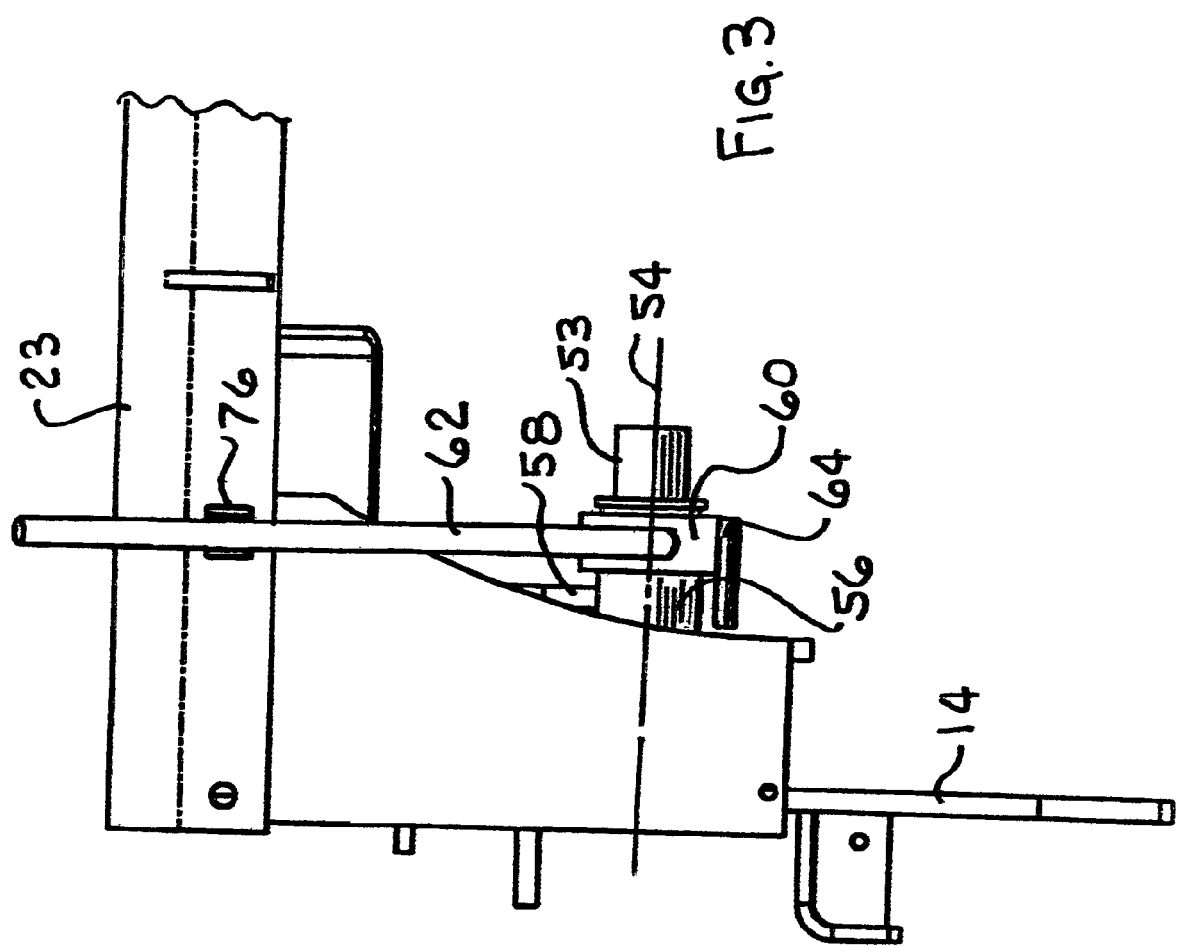
FIG. 3 is a partial rear elevation view of the left end of the first table of FIG. 1, showing some of the components of the locking mechanism of the instant invention.
Figure 4:
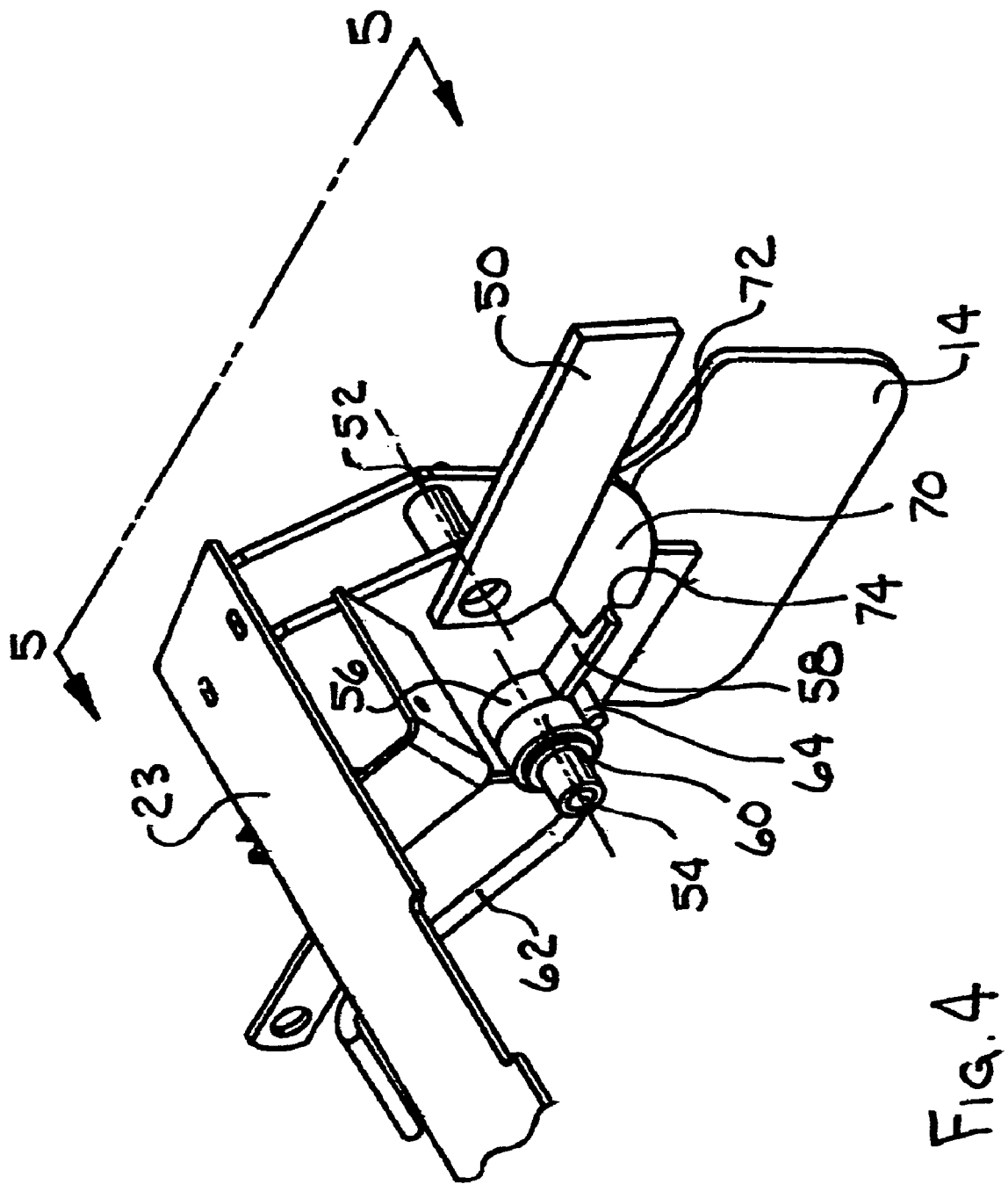
FIG. 4 is a partial front perspective view of the left end of the first table pivot, showing the components of the instant invention in the table locked up position.
Figure 5:
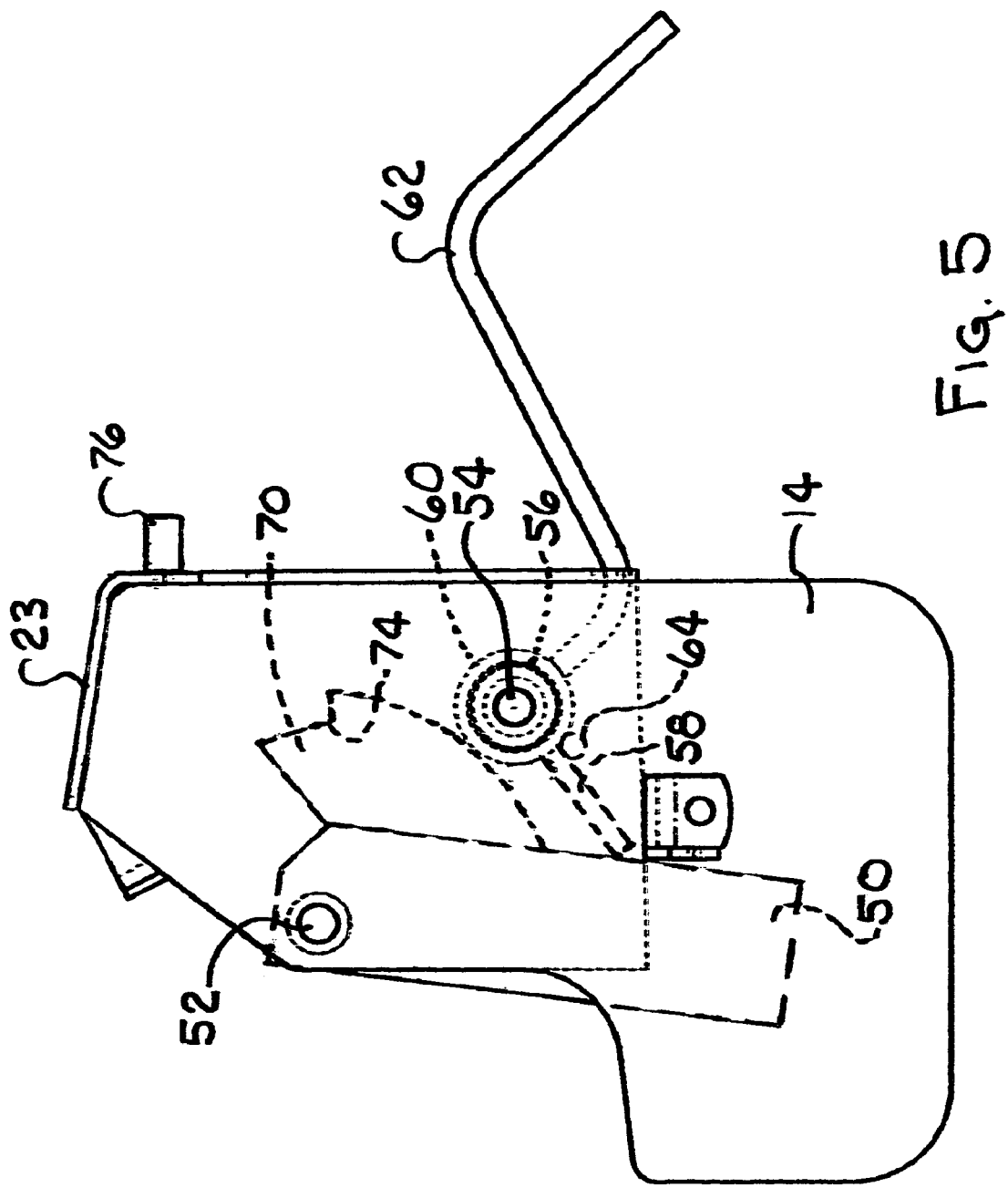
FIG. 5 is an end view of the mechanism of FIG. 4, taken along lines 5—5 with the first table in the lowered position.

When the operator or mechanic wants to either clean under the first table or wants to service components under the first table, the locking mechanism can be easily engaged to safely lock the first table in the raised position. To lock the table from the table down position shown in FIG. 3, with the handle 62 held in place by spring clip 76. The operator pulls handle 76 a short distance clockwise, releasing it from clip 76. The weight of handle 62 rotates handle hub 64 clockwise causing tang 64 to engage stop tab 58, biasing it into contact with cam surface 72 of cam 70. The operator then returns to the control panel of the bale wagon and raises the first table. Pivot arm 50 pivots clockwise about axis 52 and stop tab 58 stays in contact with cam surface 72 until it is pushed into notch 74. The operator then lowers the table via the control panel. Lowering of the table puts the weight of the table on the stop tab, locking the table in the up position.

Figure 6:
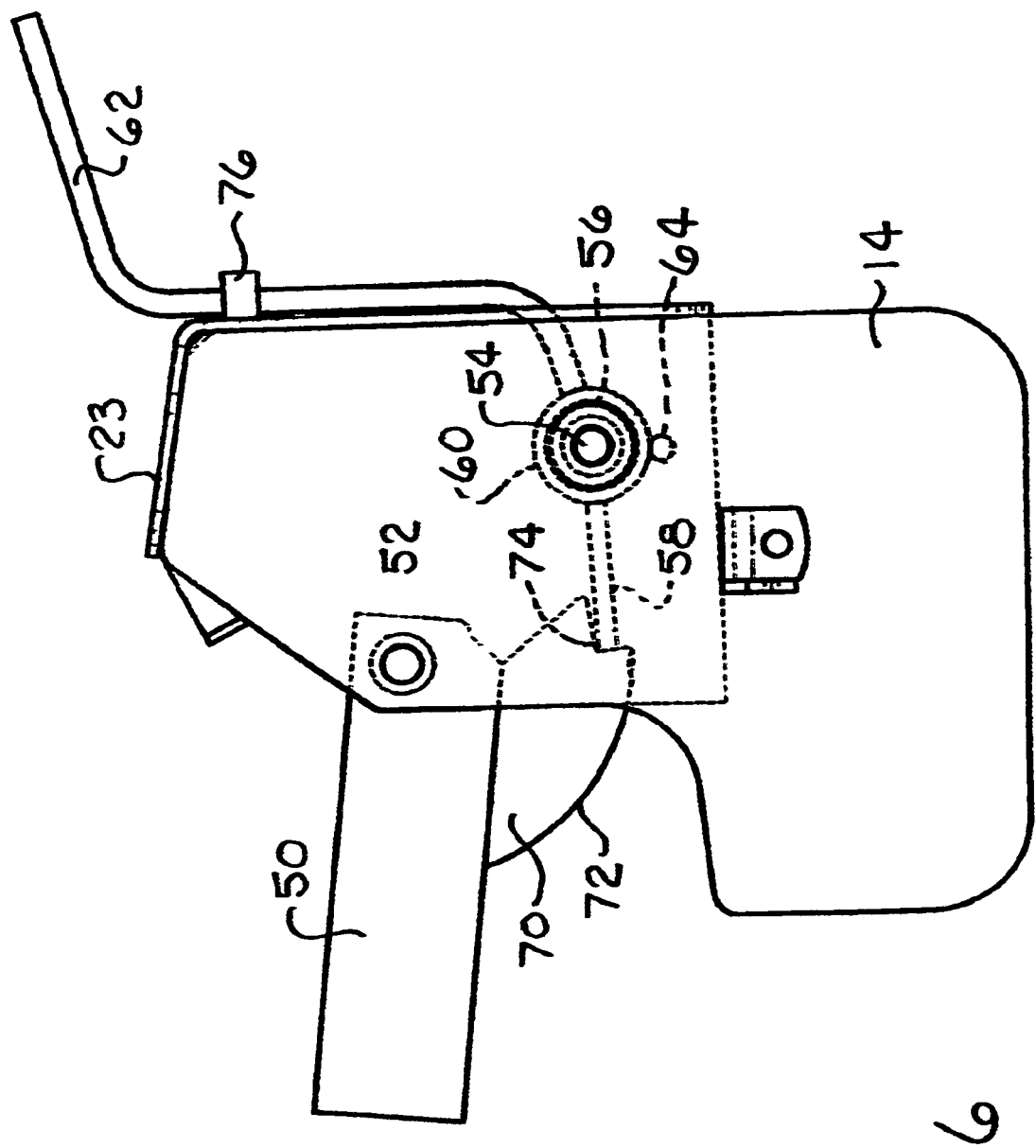
FIG. 6 is a, similar to FIG. 5, showing the locking mechanism in the unlocked position and the first table generally in the raised position.

To disengage the locking mechanism, the operator moves handle 62 counterclockwise to engage spring clip 76, as shown in FIG. 6, and then via the control panel raises the table to the full up position. Even though the table is already in the up position, activation of the hydraulic cylinder 36 will further rotate the table about axis 52 a small distance. This small distance will release stop tab 58 from notch, whereby the weight of stop tab 58 rotates stop hub 56 counterclockwise, thus allowing free use of the first table and bale wagon.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural bale wagon having a longitudinal axis corresponding to the direction of travel of the bale wagon a front end and an opposing rear end along said longitudinal axis, at least a first table adjacent said front end and a generally planar surface, said first table and said planar surface situated consecutively along said longitudinal axis, said first table having a bale-supporting portion pivotally mounted on a first transverse axis generally transverse to said direction of travel and movable between a first generally horizontal position and a second generally vertical position to deliver a row of bales to said planar surface, said first table pivoted to said second position by a single-acting hydraulic cylinder, said generally planar surface is located above said first transverse axis, said generally planar surface having a front transverse edge generally parallel to said first transverse axis of said first table, said front transverse edge of said planar surface is generally located along a vertical plane that extend through said first transverse axis, a generally longitudinal main frame upon which said at least first table and generally planar surface and said single-acting hydraulic cylinders are mounted, the improvement comprising:

a locking mechanism connected to said first table for manually selectively locking and unlocking said first table in said second position;

first and second generally planar support members affixed to said main frame and extending upwardly therefrom, said support members spaced apart transversely to said longitudinal axis generally in the vicinity of said first transverse axis; and first and second pivot arms interconnecting said first table and respective said first and second support members, and said first transverse axis of the pivotal mounting of said first table extends through the planar surfaces of said first and second support members and the pivotal mounting includes pivot pins extending through the first ends of respective said first and second pivot arms and respective said first and second support members;

wherein said locking mechanism further includes:

a cam affixed to said first pivot arm, said cam having a notch therein;

a first hub pivotally mounted to said first support member on a second transverse axis adjacent said first transverse axis, said first hub including a stop tab affixed thereto and extending generally radially therefrom;

a mechanism for selectively biasing said stop tab into generally continuous contact with said cam; and said first pivot arm and stop tab located such that said stop tab will engage said notch when said first table is in said second position.

2. The improvement of claim 1, where the mechanism for biasing further comprises:

a second hub pivotally mounted on said second transverse axis and including an elongate tang affixed thereto and extending in a direction generally parallel to said second transverse axis and into the rotational path of said stop tab; and a handle affixed to said second hub and extending generally away from said second transverse axis, whereby the weight of said handle biases said first hub counterclockwise, rotating said tang into contact with said stop tab, pushing said stop tab into contact with said cam and into said notch.

3. The improvement of claim 2, further including:

a mechanism for engaging said handle and holding it in a predetermined position.

4. The improvement of claim 3, wherein:

said first and second support members are interconnected by a lateral structural member, and said mechanism for engaging is a spring clip affixed to said structural member.

5. An agricultural bale wagon having a longitudinal axis corresponding to the direction of travel of the bale wagon, at least a first table and a centrally planar surface, said first table and said planar surface situated consecutively along said longitudinal axis, and said first table having a bale-supporting portion pivotally mounted on a first axis generally transverse to said direction of travel and movable between a first generally horizontal position and a second generally vertical position to deliver a row of bales to said planar surface, said first table pivoted to said second position by a single-acting hydraulic cylinder, a locking mechanism connected to said first table for manually selectively locking and unlocking said first table in its second raised position;

said bale wagon further having a front end and an opposing rear end along said longitudinal axis, and said first table is adjacent said front end;

said planar surface has a front transverse edge generally parallel to said first transverse axis of said first table;

said bale wagon also includes a generally longitudinal main frame upon which said at least first table and generally planar surface and said single-acting hydraulic cylinders are mounted;

said generally planar surface is located above said first transverse axis and said transverse edge of said planar surface generally located along in a vertical plane that extends through said first transverse axis;

first and second generally planar support members affixed to said main frame and extending upwardly therefrom, said support members spaced apart transversely to said longitudinal axis generally in the vicinity of said first transverse axis; and first and second pivot arms interconnecting said first table and respective said first and second support members and said first transverse axis of the pivotal mounting of said first table extends through the planar surfaces of said first and second support members and the pivotal mounting includes pivot pins extending through the first ends of respective said first and second pivot arms and respective said first and second support members;

wherein said locking mechanism further comprises:

a cam affixed to said first pivot arm, said cam having a notch therein;

a first hub pivotally mounted to said first support member on a second transverse axis adjacent said first transverse axis, said first hub including a stop tab affixed thereto and extending generally radially therefrom;

a mechanism for selectively biasing said stop tab into generally continuous contact with said cam; and said first pivot arm and stop tab located such that said stop tab will engage said notch when said first table is in said second position.

6. The bale wagon of claim 5, wherein the mechanism for biasing further comprises:

a second hub pivotally mounted on said second transverse axis and including an elongate tang affixed thereto and extending in a direction generally parallel to said second transverse axis and into the rotational path of said stop tab; and a handle affixed to said second hub and extending generally away from said second transverse axis, whereby the weight of said handle biases said first hub counterclockwise, rotating said tang into contact with said stop tab, pushing said stop tab into contact with said cam and into said notch.

7. The improvement of claim 6, further including:

a mechanism for engaging said handle and holding it in a predetermined position.

8. The improvement of claim 7, wherein:

said first and second support members are interconnected by a lateral structural member, and said mechanism for engaging is a spring clip affixed to said structural member.

* * * * *